May 3, 1932.   H. E. HODGSON   1,856,481
ELECTROMAGNETIC CLUTCH
Filed Aug. 2, 1929

INVENTOR.
Howard E. Hodgson
BY Frank H. Hubbard
ATTORNEY

Patented May 3, 1932

1,856,481

UNITED STATES PATENT OFFICE

HOWARD E. HODGSON, OF WAUWATOSA, WISCONSIN, ASSIGNOR TO CUTLER-HAMMER, INC., OF MILWAUKEE, WISCONSIN, A CORPORATION OF DELAWARE

ELECTROMAGNETIC CLUTCH

Application filed August 2, 1929. Serial No. 383,056.

This invention relates to improvements in electromagnetic clutches.

It has heretofore been the usual practice to mount the armature member of an electromagnetic clutch and in some cases the field member thereof upon a spring disc. In such clutches the spring disc serves to normally hold its associated clutch member in released position and is adapted to be deflected upon energization of the clutch to permit movement of such member into engaging position.

The spring discs heretofore employed in electromagnetic clutches were of uniform thickness throughout and in practice it has been found that such discs are open to various objections. For example it has been found that discs of this character are subjected to relatively heavy stresses upon energization of the clutch which sometimes results in breaking of the disc itself or the securing bolts therefor. Also it has been found that the operating force required to effect deflection of a disc of this character is relatively large and materially reduces the driving capacity of the clutch.

Clutches as heretofore constructed were also usually provided with an annular winding carried between inner and outer annular pole projections on the field member. This construction has been found to be relatively inefficient due to magnetic leakage between the pole projections of the field member.

The present invention has among its objects to provide an improved electromagnetic clutch which overcomes the hereinbefore mentioned objections.

Various other objects and advantages of the invention will hereinafter appear.

The accompanying drawings illustrate certain embodiments of the invention which will now be described, it being understood that the embodiments illustrated are susceptible of modification without departing from the spirit and scope of the appended claims.

Figure 1:
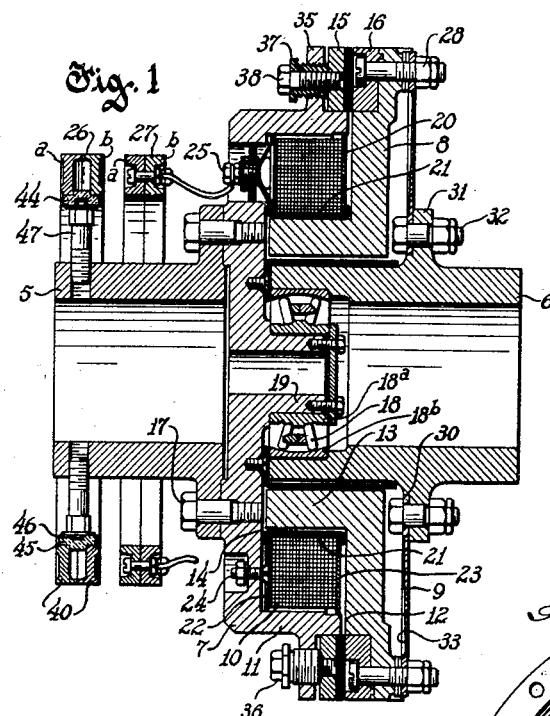
Figure 1 is a sectional view of a clutch embodying the invention.

Referring to Fig. 1, the same illustrates an electromagnetic clutch comprising hub members 5 and 6 to be secured respectively to the adjacent ends of a driving and a driven shaft, a circular field member 7 rigidly secured to hub 5 and a circular armature member 8 secured to hub 6 through the medium of a spring disc 9. The field member 7 carries an annular magnet coil 10 and the same is provided with an annular pole projection 11 which surrounds said coil and cooperates with a pole face 12 on armature member 8. Armature member 8 is provided with an annular pole projection 13 which is located within coil 10 and cooperates with a pole face 14 on field member 7. As hereinafter set forth field member 7 carries an annular friction ring 15 which cooperates with an annular friction ring 16 fixed to armature member 8.

More specifically, the hub member 5 fits within a bored recess in the left hand face of field member 7 and said field member is fixed to a projecting flange on said hub member by cap screws 17. Hub members 5 and 6 are held in centered relation by a roller bearing 18 having an inner race $18^a$ fixed to an axially extending projection 19 on the right hand face of field member 7 and an outer race $18^b$ fitting within a counterbore in the left hand end of hub 6.

The magnet coil 10 is wound upon a bobbin 20 including a sheet metal cylinder 21 having annular sheet metal discs 22 and 23 fixed to opposite ends thereof. Disc 23 fits within a counterbore in the outer end of pole projection 11 to hold the bobbin 20 and the coil 10 carried thereby in centered relation with respect to the field member 7. The bobbin 20 is fixed to field member 7 by bolts passing through openings in said field member and disc 22, one of said bolts being illustrated at 24 in Fig. 1. Coil 10 is provided with a pair of terminals, one of which is illustrated by reference numeral 25 in Fig. 1 and said terminals are arranged within openings in field member 7 and are connected by suitable leads to slip rings 26 and 27 mounted upon hub 5.

The armature member 8 projects outwardly beyond pole projection 11 of field member 7 and the spring disc 9 is secured to said armature member at points adjacent the periphery of the latter by bolts 28. The inner edge of spring disc 9 bears upon a turned shoulder 30 on hub 6 and said hub is provided with a projecting flange 31 to which said disc is secured by bolts 32. The inner face of spring disc 9 is provided with an annular recess 33 which varies in depth to provide an outward taper in that part of the disc located between the portions secured to armature 8 and flange 31.

The bolts 28 for securing spring disc 9 to armature member 8 also serve to secure the friction ring 16 to said armature member. Armature member 8 is provided with a shoulder which fits within friction ring 16 and the face of said ring is arranged substantially flush with the pole face 12 on said armature member and is provided with openings for receiving the heads of the bolts 28.

The friction ring 15 is mounted upon the outer end of the pole projection 11 of field member 7 and the same is provided with the usual friction lining for engaging the face of the friction ring 16. Ring 15 is secured to an outwardly extending flange 35 on pole projection 11 by a plurality of adjusting devices 36 each of which includes a screw plug 37 and a cap screw 38 rotatable within a bore in said plug. The plugs 37 are screwed into openings in flange 35 and the inner ends thereof abut the inner face of friction ring 15. The screws 38 are threaded into friction ring 15 and serve to hold said ring against the inner ends of the associated plugs 37. Thus by loosening cap screws 38 the plugs 37 can be adjusted to effect axial adjustment of friction ring 15. As is well understood it is necessary to adjust said friction ring so as to maintain an air gap between the field and armature members upon attraction of the latter.

Figure 3:
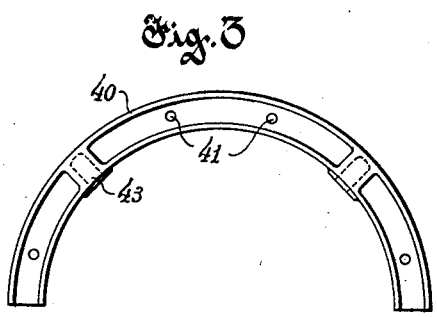
Fig. 3 is a plan view of a segment of the collector ring shown in Fig. 2.

Each of the collector rings 26 and 27 consists of two ring sections $a$ and $b$, each of which consists of a pair of semi-circular segments 40, one of which is shown in Fig. 3. As shown in Fig. 1 the collector ring segment 40 is channeled in cross section, and as shown in Fig. 3 each segment is provided with four bolt receiving holes 41. The segments 40 of sections $a$ and $b$ are arranged with their flat faces in abutting relation, and the abutting ends of the segments of section $a$ are arranged at an angle of 90 degrees with respect to the abutting ends of the segments of section $b$. With the segments arranged in this manner the bolt holes in the segments of section $a$ register with the bolt holes in the segments of section $b$ and said segments are held in assembled relation by bolts 42 located within said holes.

Each of the segments 40 has its flat face provided with a pair of radially extending semi-circular recesses 43 which are arranged so that upon assembly of the segments as hereinbefore described the recesses 43 in the segments of section $a$ register with the recesses 43 in the segments of section $b$ to provide four openings in the inner surface of the collector ring. As shown in Figs. 1 and 3 said openings each contain an insulating washer 44 having an enlarged head 45 provided with an opening 46. Each washer has a cap screw 47 associated therewith and said cap screws are threaded into tapped openings in hub 5 and each has its head provided with a projection which fits within the opening 46 of its associated washer 44. The collector rings 26 and 27 are thus adjustable by their associated screws 47 to provide for centering thereof with respect to hub 5.

In practice it has been found that a clutch of the character hereinbefore described possesses numerous advantages over prior electromagnetic clutches. For example, it has been found that tapering of the spring plate 9 increases the efficiency of the clutch by reducing the power required to move and maintain the armature member in engaged position. Also it has been found that by tapering the spring plate the stresses therein are reduced upon attraction of the armature member and particularly in that portion thereof which is secured to the hub 6. Reduction of the stresses in this portion of the plate tends to prevent breakage thereof adjacent hub 6 and also tends to prevent straining of the securing bolts 28 and 32.

Also it has been found in practice that by constructing the field and armature members in the manner hereinbefore described a more efficient magnet structure is obtained. The aforedescribed arrangement of the pole projections on the field member 7 and armature member 8 tends to reduce magnetic leakage between the pole projections and thereby increases the efficiency of the clutch. Also the rigidity of armature member 8 is increased by the pole projection thereon, which is a very desirable feature.

Figure 4:
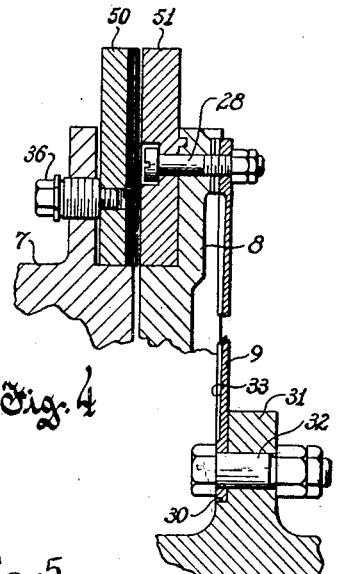
Fig. 4 is a sectional view illustrating a modification of certain of the clutch parts illustrated in Fig. 1, and, Fig. 5 is a fragmentary plan view of the spring disc shown in Fig. 1.
Figure 5:
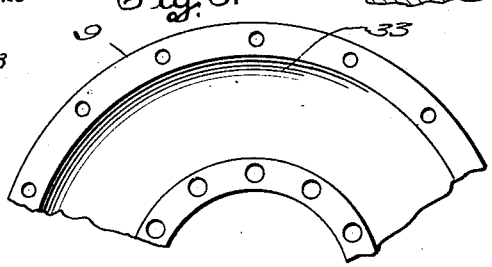
Figure 2:
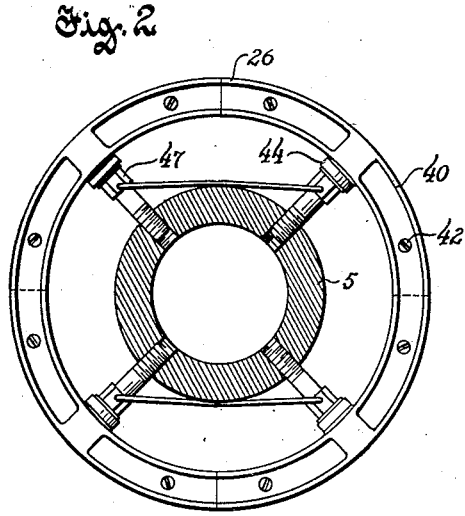
Fig. 2 is a plan view of one of the clutch collector rings shown in Fig. 1.

As shown in Fig. 4, the aforedescribed clutch can be provided with cooperating friction rings 50 and 51 which extend beyond the peripheries of the field member 7 and armature member 8. Thus the friction area of the clutch can be readily varied by varying the diameter of the friction rings to render a given size clutch capable of being used to meet different service requirements.

What I claim as new and desire to secure by Letters Patent is:

1. In an electromagnetic clutch, the combination with cooperating field and armature members and supporting means for one of said members including a spring plate formed of sheet metal and adapted to be deflected to permit movement of its associated member into engaging position, portions of said plate being of reduced sectional area to reduce stresses in certain portions of said plate upon deflection thereof.

2. In an electromagnetic clutch, the combination with cooperating field and armature members and supporting means for one of said members including a spring disc formed of sheet metal and adapted to be deflected to permit movement of its associated member into engaging position, the thickness of said plate being varied to reduce stresses in certain parts of said plate upon deflection thereof.

3. In an electromagnetic clutch, the combination with cooperating field and armature members, and a spring disc for supporting one of said members, said disc having a portion the thickness of which tapers outwardly.

4. In an electromagnetic clutch, the combination with cooperating field and armature members and supporting means for one of said members including a hub and an outwardly tapered annular spring disc secured adjacent its outer edge to said member and adjacent its inner edge to said hub.

5. In an electromagnetic clutch, the combination with cooperating field and armature members and supporting means for said armature member including a hub and an annular spring disc secured adjacent its outer edge to said armature member and adjacent its inner edge to said hub, said disc being recessed to provide an outwardly tapered portion between said armature member and its associated hub.

6. In an electromagnetic clutch, in combination, cooperating field and armature members and an annular operating winding carried by said field member, said field member having an annular pole projection thereon which surrounds said winding and cooperates with a pole face on said armature member and said armature member having a pole projection thereon which projects into the interior of said winding and cooperates with a pole face on said field member.

In witness whereof, I have hereunto subscribed my name,

HOWARD E. HODGSON.